United States Patent [19]

Thoma et al.

[11] Patent Number: 4,484,268
[45] Date of Patent: Nov. 20, 1984

[54] APPARATUS AND METHOD FOR DECODING AN OPERATION CODE USING A PLURALITY OF MULTIPLEXED PROGRAMMABLE LOGIC ARRAYS

[76] Inventors: Nandor G. Thoma, 4686 NW. 2nd Ct., Boca Raton, Fla. 33431; Victor S. Moore, R.R. #1, Box 603, Pompano Beach, Fla. 33064; Wayne R. Kraft, 10720 NW. 43 Ct., Coral Springs, Fla. 33065

[21] Appl. No.: 350,661

[22] Filed: Feb. 22, 1982

[51] Int. Cl.³ .............................................. G06F 9/00
[52] U.S. Cl. .................................................... 364/200
[58] Field of Search ......................................... 364/200

[56] References Cited

U.S. PATENT DOCUMENTS

| | | | |
|---|---|---|---|
| 3,760,369 | 9/1973 | Kemp | 340/172.5 |
| 3,949,370 | 4/1976 | Reyling, Jr. et al. | 364/200 |
| 3,983,538 | 9/1976 | Jones | 340/172.5 |
| 3,993,919 | 11/1976 | Cox et al. | 307/279 |
| 4,034,356 | 7/1977 | Howley et al. | 340/173 R |
| 4,237,542 | 12/1980 | Cukier | 364/900 |

FOREIGN PATENT DOCUMENTS 1314486  4/1973  United Kingdom.

OTHER PUBLICATIONS

Kraft, et al., "A Flexible Processor on a Single Semiconductor Substrate", U.S. patent application, Ser. No. 06/105,711, filed Dec. 29, 1979.

Schmookler, "Two-Level Programmed Logic Array Adder", IBM Technical Disclosure Bulletin, vol. 21, No. 11, Apr. 1979, pp. 4313-4316.

Primary Examiner—Raulfe B. Zache

[57] ABSTRACT

A plurality of programmable logic arrays (PLA's) operate in parallel, each to decode an operation code (OP code). A portion of the OP code is decoded to select one of the PLA's, and the decoded OP code from the selected PLA is gated through a multiplexer to provide the control code corresponding to the OP code.

4 Claims, 2 Drawing Figures

APPARATUS AND METHOD FOR DECODING AN OPERATION CODE USING A PLURALITY OF MULTIPLEXED PROGRAMMABLE LOGIC ARRAYS

TECHNICAL FIELD

Our invention relates to an improvement in a programmable logic array (PLA) configuration useful for decoding of computer operation codes.

BACKGROUND ART

Prior art patent application Ser. No. 06/105,711, filed Dec. 20, 1979 by W. R. Kraft, et al, for "A Flexible Processor On A Single Semiconductor Substrate" of common assignee, provides for the decoding of computer operation codes (OP codes), or computer instructions, using a programmable logic array (PLA). A PLA typically includes an AND array and an OR array. Decoding of an OP code is done by applying the OP code to the AND array of the PLA, and extracting the proper control information from the OR array of the PLA. For all but the simplest computing machines, the PLA becomes physically large. This results in a performance degradation manifest in slower machine speeds. For example, jump instructions execute slowly when the jump OP code is decoded using such prior art PLA's because if the jump is made, processing must wait for another OP code to propagate through the PLA.

SUMMARY OF THE INVENTION

According to our invention, there is provided an improvement to a programmable logic array (PLA) used for decoding a computer instruction, or operation code (OP code), the improvement characterized by a plurality of programmable logic array (PLA) means, each said PLA means responsive to said OP code for providing respective decoded outputs; decode multiplexer means responsive to a portion of said OP code for providing a gating signal; and multiplexer gate means for isolating each said PLA means and for selecting and loading to control code output lines the decoded output from the PLA means selected by said gating signal.

BRIEF DESCRIPTION OF THE DRAWINGS

The details of our invention will be described in connection with the accompanying drawings, in which FIG. 1 is a schematic drawing illustrating the apparatus of our invention; and in which

DESCRIPTION OF THE PREFERRED EMBODIMENT

Figure 1:
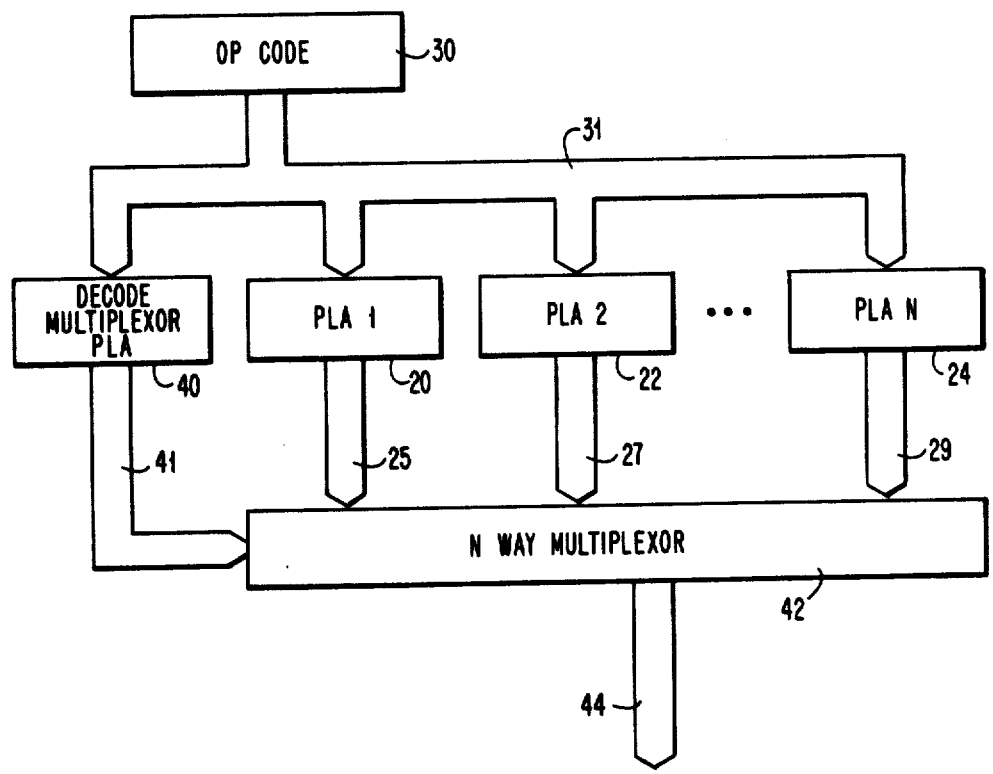

Referring to FIG. 1, a decoding apparatus constructed in accordance with our invention includes a plurality of programmable logic arrays (PLA's) 20, 22, 24. Operation code storage means 30 provides on lines 31 to each of PLA's 20, 22, 24 (three are shown for illustrative purposes only) the operation code (OP code) selected for decoding. At least a portion of OP code 30 is fed to decode multiplexer 40, which may optionally be implemented as another PLA. Decode multiplexer 40 decodes that portion of OP code 30 fed to it to select that one of PLA's 20-24 which is to provide the decoded OP code. This is done by using select bus output 41 of decode multiplexer 40 to gate through multiplexer 42 to control code bus 44 the decoded OP code output from the selected one of PLA's 20-24. Multiplexer 42 further serves to electrically isolate each of PLA's 20-24 from the others.

Decode multiplexer 40 preferably decodes that portion of OP code 30 which identifies the instruction class, and each of PLA's 20-24 is optimized for decoding a given instruction class. Examples of instruction classes include, inter alia, memory-to-memory and memory-to-register instructions. PLA's 20-24 all operate in parallel to decode OP code 30 and provide respective control code 1 on lines 25, control code 2 on lines 27, and control code N on lines 29; however, only that PLA's 20-24 which will decode a select OP code 30 to the correct control code is gated to control code bus 44 through multiplexer 42.

Figure 2:
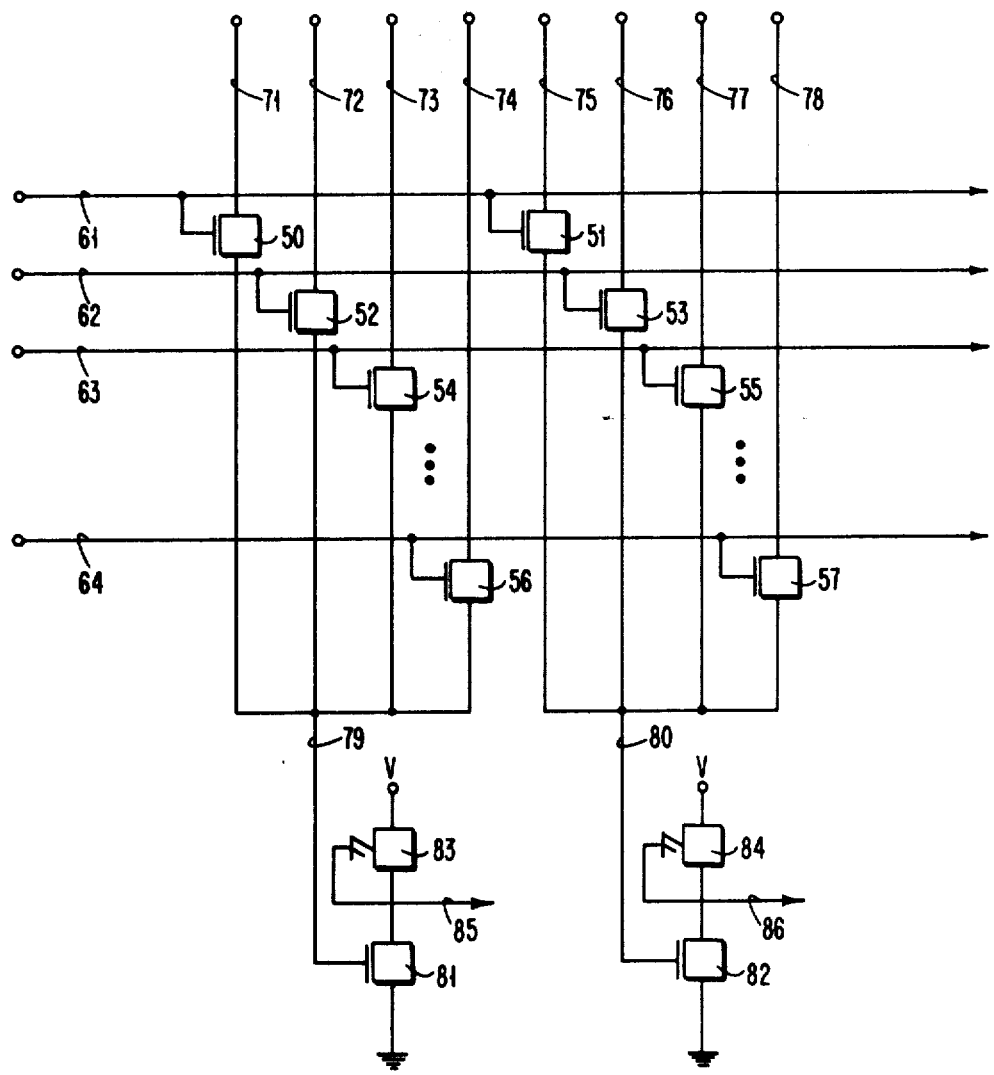
FIG. 2 is a schematic drawing illustrating a portion of N way multiplexer 42 of FIG. 1.

Referring now to FIG. 2, we will describe one exemplary implementation of N way multiplexer 42. In this implementation, we illustrate an array of transfer field effect transistors (FET's) 50-57 sufficient to multiplex two product term bits from each of four PLA's to gate two control bits to bus 44. Of course, the array can be extended to handle more bits from more PLA's.

Select bus 41 from decode multiplexer 40 herein provides select lines 61-64. Lines 71-74 provide product term bit 0, respectively from PLA 20, PLA 22, PLA (not shown), and PLA 24. Lines 75-78 provide product term bit 1, respectively from PLA 20, PLA 22, PLA (not shown) and PLA 24.

Select line 61 is connected to the gates of FET's 50 and 51, corresponding to bits 0 and 1 from PLA 20. Similarly, select line 62 is connected to the gates of FET's 52, 53; select line 63 to the gates of FET's 54 and 55; and select line 64 to the gates of FET's 56 and 57. The source terminals of each of FET's 50, 52, 54, 56 are connected by line 79 to the gate of FET 81; and those of FET's 51, 53, 55, 57 to the gate of FET 82. When an FET 50-57 is selected by a signal on a connected select line 61-64, the FET source is shorted to the drain (lines 71-78 are connected to the drain terminals of FET's 50-57 as shown), and the signal (positive or negative) on the gated lines 71-78 applied to the connected one of lines 79, 80. FET 83 provides a load device, which in connection with FET 81, is used to amplify and invert the signal on line 79 for loading to control code bus 44 bit 0 line 85. Similarly, FET's 82, 84 amplify and invert the signal on line 80 for loading to control code bus 44 bit 1 line 86.

We claim:

1. Apparatus for decoding an operation code, the apparatus including means for providing operation code signals, a control code bus, and a programmable logic array responsive to said operation code signals for generating control code signals therefrom, the improvement comprising:

a plurality of programmable logic array means each responsive to said operation code signals and concurrently operable for generating respective decoded output signals; and decode multiplexer means further responsive to said operation code signals for selecting one of said plurality of programmable logic array means and for gating the decoded output signals therefrom to said control code bus as control code signals.

2. The apparatus of claim 1 wherein each said programmable logic means is adapted to decode operation codes of a predetermined class, and said decode multiplexer means includes decode means for determining the class of a selected operation code and in response thereto for generating a select signal for selecting the corresponding programmable logic array means.

3. The apparatus of claim 1 wherein said decode means comprises a programmable logic array.

4. A programmable logic array implemented method for decoding a selected operation code corresponding to a predetermined operation class to generate a control code, the method comprising the steps of:

concurrently operating a plurality of programmable logic arrays to generate from the selected operation code respective decoded output signals;

determining the operation class of the selected operation code; and gating the decoded output signals from that programmable logic array corresponding to said operation class to provide said control code.

* * * * *

UNITED STATES PATENT AND TRADEMARK OFFICE
CERTIFICATE OF CORRECTION

PATENT NO. : 4,484,268
DATED : November 20, 1984
INVENTOR(S) : NANDOR G. THOMA ET AL It is certified that error appears in the above—identified patent and that said Letters Patent is hereby corrected as shown below:

On the title page Assignee:

Line [73] on the face of the patent should read --International Business Machines Corporation--

Signed and Sealed this

Second Day of April 1985

[SEAL]

Attest:

DONALD J. QUIGG

Attesting Officer     Acting Commissioner of Patents and Trademarks